United States Patent Office 2,743,298
Patented Apr. 24, 1956

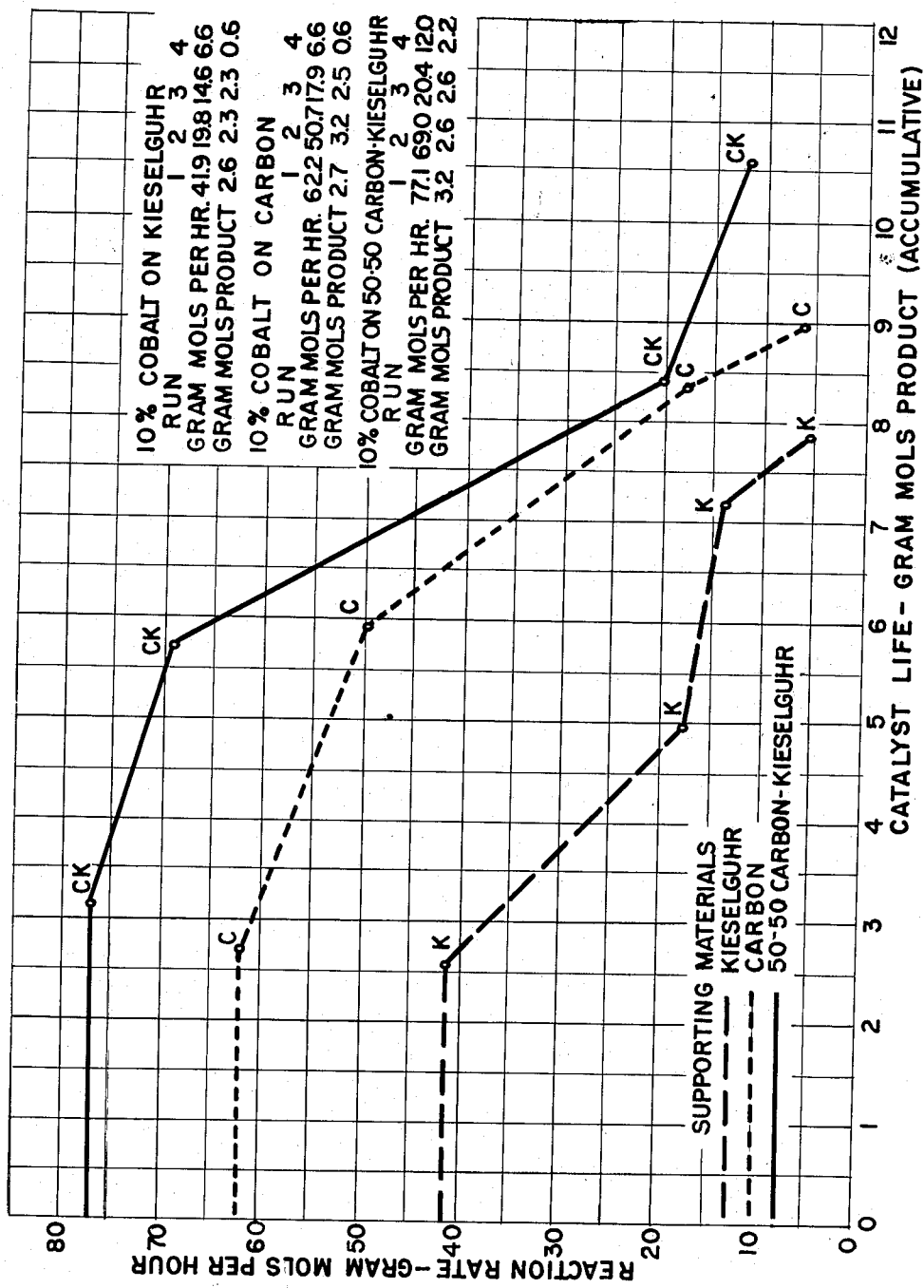

2,743,298

OXO SYNTHESIS IN THE PRESENCE OF ACTIVATED CARBON

Ralph E. De Busk, Kingsport, Tenn., assignor to Eastman Kodak Company, Rochester, N. Y., a corporation of New Jersey Application February 27, 1953, Serial No. 339,262

2 Claims. (Cl. 260—604)

This invention relates to an improved Oxo catalyst support comprising a mixture of activated carbon and a material such as kieselguhr, filtercel, diatomaceous earth and the like. It also relates to the improving of the Oxo reaction by addition of activated carbon to a conventional catalyst, or by use alone as catalyst support.

The Oxo reaction involves the production of oxygenated compounds by the reaction of olefins with carbon monoxide and hydrogen in the presence of a catalyst containing a group VIII metal, cobalt and iron being particularly useful, with cobalt preferred. An early patent relating to the process is Roelen U. S. Patent No. 2,327,066. The catalysts used in the reaction are conveniently carried by a support, commonly kieselguhr and the like. Mixed supports have also been suggested as in Sensel et al. U. S. Patent No. 2,517,036, where silica-stabilized alumina and uncalcined diatomaceous earth are used.

I have found that greatly superior results are accomplished in the Oxo reaction by use of a catalyst carrier comprising a mixture of activated carbon and kieselguhr or the like, preferably in about equal parts. This type of support has been found quite unexpectedly to provide greater reaction rates along with greater catalyst life than when either component is used alone, all other conditions being the same. I have also found that the olefin polymerization which can be troublesome in the Oxo synthesis, for example, in inactivating the catalyst, is greatly reduced, and in fact, substantially eliminated by use of the new mixed support. I have found further that improved results are obtained by merely adding activated carbon to a conventional Oxo catalyst, or by using activated carbon alone as the support.

Accordingly, it is an object of my invention to provide a mixed activated carbon and kieselguhr or the like catalyst support for Oxo catalysts. A further object is to provide a catalyst support giving increased reaction rates and catalyst life, without any undesirable change in the reaction products. A further object of the invention is to provide an Oxo catalyst support which does not favor olefin condensation reactions. Another object is to provide improved Oxo reaction results by addition of activated carbon to conventional Oxo catalysts or by use of the activated carbon alone as the catalyst support. Still another object is to provide a new use for activated carbon.

These and other objects are accomplished in accordance with the invention by reacting olefinic compounds with carbon monoxide and hydrogen in the presence of Oxo synthesis catalysts supported on the herein mentioned catalyst supports or in the presence of any supported Oxo synthesis catalyst known to the art mixed with activated carbon. This reaction was carried out using equipment and conditions suitable to the Oxo synthesis as follows: Carbon monoxide and hydrogen were charged into 1180 cc. stainless steel rocker type autoclave containing the supported catalyst slurried in n-butyl alcohol. The ratio of the carbon monoxide to the hydrogen was 1:1, this being the preferred ratio in a range extending from 4:1 to 1:4. The olefins were charged independently and subsequently to the carbon monoxide and hydrogen and represented the concentration of 10 to 20% of the total gases charged in the autoclave. All reactions in the autoclave were started at 130° C. and the heat of reaction was controlled in the range of 130 to 165° C. The catalyst activity ratio for catalysts 40 to 70% reduced did not vary appreciably with the temperature. The relative catalyst activity for the supported catalyst mentioned herein was independent of the slurry medium.

In catalyst preparation the metal salts of the metals of group VIII such as acetates, carbonates, and nitrates along with metal carbonyls of the metals of group VIII were used in preparing the catalyst on the desired support. These catalysts were reduced in a conventional manner except for catalysts prepared from cobalt carbonyl which needed no reduction. No advantageous catalytic effect was observed by the preparation of the catalyst from any particular salt of the metals of group VIII, and the activity of the reduced type catalyst and the non-reduced carbonyl type were essentially the same where the reduced type was 60 to 80% reduced. All of the types of catalysts referred to in this paragraph are intended to be within the scope of the reference in the claims to a catalytic material selected from the group consisting of iron and cobalt.

Commercial grades of activated carbon were used, and any type activated carbon is an effective catalyst support and promoter for use in the Oxo-synthesis. No pronounced advantage of one type activated carbon over another was observed, and all types tested were effective without pretreatment. The carbon may be used in lumps, pellets, or pulverized form, the latter being preferred.

Commercial grades of kieselguhr, filtercel, and diatomaceous earth were used and are effective catalyst supports for use in conjunction with carbon. Lumps, pellets, or the pulverized form may be used, the latter being preferred.

Distillation data revealed no new products, no change in ratio of one product to another, and no change in yield. No olefin polymerization was experienced.

The attached drawing comprises a graph showing the reaction rates in the Oxo synthesis as a function of catalyst life in recycled catalysts containing various supports. Catalyst life is an expression of the gram mols of product produced per liter of reactor space per unit catalyst employed, the unit here being 20 grams. The reaction rate is an expression of reaction speed in gram mols per liter per hour. The activity and life of catalysts tested were determined by a series of batchwise reactions. The accumulated gram mols of product in each series of runs represent the catalyst life of each type catalyst tested. The three catalysts are:

1. 10 weight percent cobalt supported on 90 weight percent kieselguhr;
2. 10 weight percent cobalt supported on 90 weight percent carbon;
3. 10 weight percent cobalt supported on 45 weight percent kieselguhr and 45 weight percent carbon.

The relatively low weight percent cobalt was chosen in order to reduce the reaction rate and to shorten the life of the catalyst used enough to obtain practical experimental data. Using the above catalysts, ethylene, carbon monoxide, and hydrogen were reacted in the liquid phase under constant conditions to produce the data described herein.

The average reaction rates for the three catalysts employed in this graphic study were: (1) 10 weight percent cobalt supported on kieselguhr, 20.6 gram mols per hour; (2) 10 weight percent cobalt supported on carbon, 34.4 gram mols per hour; (3) and 10 weight percent cobalt supported on 45 weight percent kieselguhr and 45 weight percent carbon, 44.6 gram mols per hour. The cobalt on carbon catalyst is 1.67 times more active than cobalt on kieselguhr, and the cobalt on a 50–50 mixture of kieselguhr and carbon is 2.16 times more active than cobalt on kieselguhr. From the graph and the averages of the rates of reaction used in the graph it is very apparent that cobalt supported on a 50–50 mixture by weight of carbon and kieselguhr is substantially more active in the Oxo synthesis than are cobalt catalysts supported on carbon alone or on kieselguhr alone.

In assembling the data for the graph, the olefin used was ethylene and the CO and hydrogen were supplied in a ratio of about 1:1 to the autoclave. The slurrying medium for the catalyst was n-butyl alcohol and the reaction was carried out at a temperature range of 130 to 180° C. and a pressure of 3000 p. s. i. Other known slurrying media can be used such as inert hydrocarbons and active media such as the lower aliphatic monohydric alcohols, of which n-butanol is the best medium. Ketones can also be used.

The recycling of the catalyst involved the following: After the carbon monoxide, hydrogen and olefins were reacted in the autoclave in the presence of the catalyst suspended in n-butyl alcohol, the exact amount of product produced was calculated from the quantities of the reacted gases and a corresponding amount of liquid was then distilled from the autoclave, the liquid then remaining being equivalent to the starting liquid in which the catalyst was suspended. This completed one cycle of catalyst use. The autoclave was again recharged with carbon monoxide, hydrogen and olefin and the reaction repeated in the presence of the suspended catalyst liquor from the first run. In this manner runs 2, 3 and 4 were made thereby effecting catalyst recycling for each successive run.

Table No. 1 which follows, comprises data showing that carbon promotes Oxo synthesis reactions when added to a conventional catalyst. A mixture of pulverized Oxo catalyst and pulverized activated carbon slurried in a medium comprising alcohols, acetals and esters increased the reaction rate in the Oxo synthesis by 2.18 to 3.73 times over the rate obtained in the absence of carbon. The catalyst to which the carbon was added was made up of 37% cobalt, 3 to 4% magnesium, and 3 to 4% thorium supported on kieselguhr. This catalyst was prepared by precipitating the metal carbonates on kieselguhr and reducing this combination in a conventional manner. Carbon was added to this Oxo catalyst in a ratio of 0:5:1 by weight.

In assembling the data for Table 1 the olefins were ethylene and propylene, and the CO and hydrogen were supplied in a ratio of about 1:1. The slurrying medium was n-butyl alcohol and the reaction conditions and time were as above.

Table 1

| Catalyst | G. Mols Product | G. Mols per Hour | Olefin |
|---|---|---|---|
| 20 g. Oxo catalyst on kieselguhr | 2.6 | 18.5 | Ethylene. |
| 20 g. Oxo catalyst on kieselguhr and 10 g. carbon. | 2.55 | 62.2 | Do. |
| 20 g. Oxo catalyst on kieselguhr | 2.33 | 23.3 | Do. |
| 20 g. Oxo catalyst on kieselguhr and 10 g. carbon. | 2.5 | 69.2 | Propylene. |
| 20 g. Oxo catalyst on kieselguhr | 2.50 | 31.6 | Do. |

Table 2 is comprised of data showing that carbon is not only a good catalyst support for Oxo synthesis catalysts but a support which produced a more active catalyst than that produced by kieselguhr. The catalyst prepared on carbon was comprised of 37% cobalt, 3 to 4% magnesium, and 3 to 4% thorium and carbon. The catalyst prepared on kieselguhr was described previously for Table 1. It is also evident from the data in the graph that carbon is an excellent catalyst support and a support which produces a more active catalyst than produced by kieselguhr. The data in Tables 1 and 2 are not to be directly compared with the data in the graph due to the nature of the catalyst used and to the fact that different reaction media were used.

In assembling the data for Table 2 the olefin was ethylene, and the CO and hydrogen were supplied in a ratio of about 1:1. The slurrying medium was n-butyl alcohol and the reaction conditions and time were as above.

Table 2

| Catalyst | G. Mols Product | G. Mols per Hour | Olefin |
|---|---|---|---|
| 20 g. Oxo catalyst on carbon | 2.55 | 34.0 | Ethylene. |
| Do | 3.11 | 50.2 | Do. |
| 20 g. Oxo catalyst on kieselguhr | 2.33 | 23.3 | Do. |

In referring to the support in the claims I have used the phrase "of the nature of kieselguhr" which is intended to refer to all similar silaceous supports such as filtercel, diatomaceous earth, synthetic gels, silica, etc., as well as alumina.

I claim:

1. In a process for the synthesis of oxygenated compounds at about 130–180° C. and under elevated pressure, by the catalytic reaction of a lower aliphatic olefin, carbon monoxide and hydrogen, the carbon monoxide and hydrogen being fed to the reaction in a ratio to each other of from 4:1 to 1:4, the improvement which comprises catalyzing the reaction by contacting the reaction mixture with a reduced cobalt catalyst carried on a support consisting of approximately equal parts of kieselguhr and activated carbon suspended in butanol, whereby increased catalyst activity and life are obtained, compared with use of kieselguhr or activated carbon alone as the support.

2. In a process for the synthesis of oxygenated compounds at about 130–180° C. and under elevated pressure, by the catalytic reaction of a lower aliphatic olefin, carbon monoxide and hydrogen, the carbon monoxide and hydrogen being fed to the reaction in a ratio to each other of from 4:1 to 1:4, the improvement which comprises catalyzing the reaction by contacting the reaction mixture with a reduced catalyst selected from the group consisting of cobalt and iron carried on a support consisting of approximately equal parts of kieselguhr and activated carbon suspended in a liquid carrier selected from the group consisting of hydrocarbons, lower aliphatic monohydric alcohols and lower aliphatic ketones, whereby increased catalyst activity and life are obtained, compared with use of kieselguhr or activated carbon alone as the support.

References Cited in the file of this patent

UNITED STATES PATENTS

| | | |
|---|---|---|
| 2,407,814 | Cheney | Sept. 17, 1946 |
| 2,448,375 | Larson | Aug. 31, 1948 |
| 2,477,553 | McKeever | July 26, 1949 |
| 2,576,113 | Hagemeyer | Nov. 27, 1951 |